(12) United States Patent
Sekiguchi et al.

(10) Patent No.: US 8,997,708 B2
(45) Date of Patent: Apr. 7, 2015

(54) INTAKE MANIFOLD

(75) Inventors: Keisuke Sekiguchi, Anjo (JP);
Tomohisa Senda, Kariya (JP); Hideto Yano, Toyota (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 0 days.

(21) Appl. No.: 14/236,746

(22) PCT Filed: Sep. 10, 2012

(86) PCT No.: PCT/JP2012/073075
§ 371 (c)(1),
(2), (4) Date: Feb. 3, 2014

(87) PCT Pub. No.: WO2013/051371
PCT Pub. Date: Apr. 11, 2013

(65) Prior Publication Data
US 2014/0165948 A1    Jun. 19, 2014

(30) Foreign Application Priority Data
Oct. 6, 2011    (JP) ................................. 2011-222123

(51) Int. Cl.
*F02M 35/104*    (2006.01)
*F02M 35/10*    (2006.01)

(52) U.S. Cl.
CPC ............. *F02M 35/104* (2013.01); *F02M 35/10* (2013.01)

(58) Field of Classification Search
USPC ............................ 123/184.21, 198 D, 184.47
See application file for complete search history.

(56) References Cited

U.S. PATENT DOCUMENTS

| 2004/0067701 A1 | 4/2004 | Araki et al. |
| 2011/0232598 A1 | 9/2011 | Harada et al. |

FOREIGN PATENT DOCUMENTS

| JP | 7-63131 A | 3/1995 |
| JP | 8-21249 A | 1/1996 |
| JP | 8-49609 A | 2/1996 |

(Continued)

OTHER PUBLICATIONS

International Search Report (PCT/ISA/210) mailed on Dec. 4, 2012, by the Japanese Patent Office as the International Searching Authority for International Application No. PCT/JP2012/073075.
Written Opinion (PCT/ISA/237) mailed on Dec. 4, 2012, by the Japanese Patent Office as the International Searching Authority for International Application No. PCT/JP2012/073075.

(Continued)

*Primary Examiner* — Noah Kamen
(74) *Attorney, Agent, or Firm* — Buchanan Ingersoll & Rooney PC

(57) ABSTRACT

An intake manifold capable of discharging oil or water in a liquid reservoir in a stable manner includes an introduction section for introducing air to a combustion chamber of an engine, a liquid reservoir provided under the introduction section for retaining a liquid medium, a differential pressure tank including a first chamber, a second chamber, and a differential pressure valve for regulating flow from the second chamber to the first chamber, a return passage for allowing the liquid medium accumulated in the liquid reservoir to return to the first chamber from the liquid reservoir when the pressure in the second chamber is higher than the pressure in the first chamber, and an exhaust passage for discharging the liquid medium having flown into the second chamber from the first chamber to the instruction section when the pressure in the second chamber is lower than the pressure in the first chamber.

5 Claims, 4 Drawing Sheets

(56) References Cited

FOREIGN PATENT DOCUMENTS

| | | |
|---|---|---|
| JP | 2002-4825 A | 1/2002 |
| JP | 2004-52681 A | 2/2004 |
| JP | 2005-226476 A | 8/2005 |
| JP | 2012-87773 A | 5/2012 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Apr. 17, 2014, by the International Bureau of WIPO in corresponding International Application No. PCT/JP2012/073075. (6 pages).

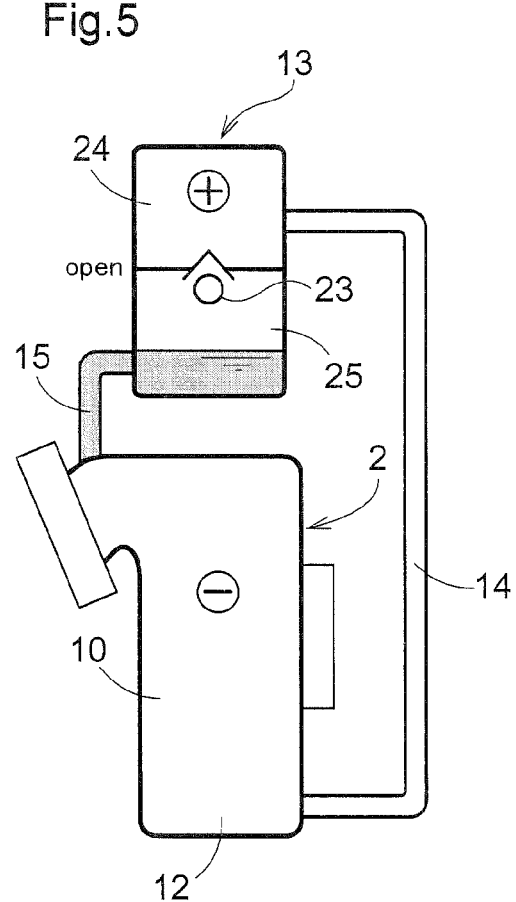

INTAKE MANIFOLD

TECHNICAL FIELD

The present invention relates to an intake manifold for introducing a gas mixture into a combustion chamber of an engine.

BACKGROUND ART

A conventional example of an intake manifold is provided upstream of a combustion chamber of an engine. A gas mixture is introduced into the combustion chamber through the intake manifold. Since EGR gas or blow-by gas is introduced through the intake manifold, oil or water contained in the EGR gas or the blow-by gas is accumulated within the intake manifold. If a large volume of oil is introduced into the engine, a knocking may occur due to incomplete combustion. Also, a large volume of water introduced into the engine could be a cause of misfire. Patent Document 1 identified below relates to a technique for discharging oil or water accumulated in the intake manifold properly.

A construction for discharging oil accumulated in an intake passage according to Patent Document 1 includes, in addition to the intake passage, an intake throttle valve and a communicating pipe. Air discharged from an exhaust port undergoes predetermined processing in the intake passage to be supplied to an intake port. The intake throttle valve is provided within the intake passage and is configured to open the intake passage full when the drive of an internal combustion engine is stopped. The communicating pipe is arranged parallel with the intake passage between an oil reservoir of the intake passage and the intake throttle valve to allow the oil reservoir to communicate with the vicinity of the intake throttle valve adjacent the internal combustion engine. This system causes oil accumulated in the intake passage to be drawn up by negative pressure and returned to the intake passage.

CITATION LIST

Patent Literature

Patent Document 1: Japanese Unexamined Patent Application Publication No. 2005-226476

SUMMARY OF INVENTION

With the above-described construction, the pressure in the intake passage is constantly changed depending on the state of the engine. Thus, oil may not be drawn up in a stable manner from the oil reservoir if sufficient negative pressure for drawing up oil is not achieved. Then, oil in the oil reservoir may not be discharged properly.

The object of the present invention is to provide an intake manifold that is capable of discharging oil or water in a liquid reservoir in a stable manner in view of the above-described disadvantage.

In order to achieve the above object, the present invention provides an intake manifold comprising an introduction section for introducing air to a combustion chamber of an engine, a liquid reservoir provided under the introduction section for retaining a liquid medium therein, a differential pressure tank including a first chamber, a second chamber, and a differential pressure valve for regulating a flow from the second chamber to the first chamber, a return passage for allowing the liquid medium accumulated in the liquid reservoir to return to the first chamber from the liquid reservoir when the pressure in the second chamber is higher than the pressure in the first chamber, and a exhaust passage for discharging the liquid medium having flown into the second chamber from the first chamber to the instruction section when the pressure in the second chamber is lower than the pressure in the first chamber.

With the above arrangement, the liquid medium in the liquid reservoir is drawn up by the pressure difference between the first chamber and the second chamber of the pressure differential tank, and thus can be stably discharged. Further, the use of the relatively inexpensive differential pressure valve dispenses with any pump that is more expensive than the differential pressure valve, which can achieve a low-cost construction. Moreover, the exhaust passage can be formed integrally with the introduction section, for example, which can reduce the manufacturing cost and save the space.

Further, it is preferable that the differential pressure tank is mounted above the introduction section.

With the above arrangement, when the differential pressure valve is opened, the liquid medium having drawn up to the first chamber can flow into the introduction section through the second chamber smoothly.

Also, it is preferable that the engine is provided with a supercharger.

With the engine provided with the supercharger, the pressure difference between the first chamber and the second chamber can be set to a large value, as a result of which an increased amount of liquid medium in the liquid reservoir can be drawn up. Thus, the liquid medium can be drawn up efficiently.

Further, it is preferable that the engine includes a plurality of intake ports, and the exhaust passage is a distribution passage for distributing the liquid medium to the plurality of the intake ports.

When the mixing ratio of air and fuel introduced to a specific intake port is increased (if the fuel concentration becomes high), for example, a knocking may easily occur. On the other hand, when a large volume of water is introduced into a specific intake port, misfire may easily occur. With the above arrangement, the liquid medium having drawn up to the differential pressure tank can be discharged to be distributed to each of the intake ports, which prevents high concentration of the fuel or a large volume of water in the specific intake port. Therefore, the occurrence of knocking or misfire can be restrained.

Still further, it is preferable that the engine includes a plurality of intake ports, and lengths of the exhaust passage measured from the differential pressure tank to the respective intake ports are all equal.

Since the lengths of the exhaust passage measured from the differential pressure tank to the respective intake ports are all equal as mentioned above, the liquid medium can be evenly distributed to the plurality of intake ports through the exhaust passage. As a result, the fuel/air mixing ratio can be uniform in each cylinder of the engine, and it is prevented that a large volume of water flows into only a specific cylinder. Thus, any knocking and misfire can also be prevented.

BRIEF DESCRIPTION OF DRAWINGS

FIG. 5 is a schematic view illustrating the principle of drawing up the liquid medium.

DESCRIPTION OF EMBODIMENTS

Embodiments of the present invention will be described in detail hereinafter. An intake manifold 2 according to the present invention is provided in an intake device 100. The intake device 100 has a function to mix air with part of exhaust gas properly and supply the mixture to an engine E.

1. Construction of Engine

Figure 1:
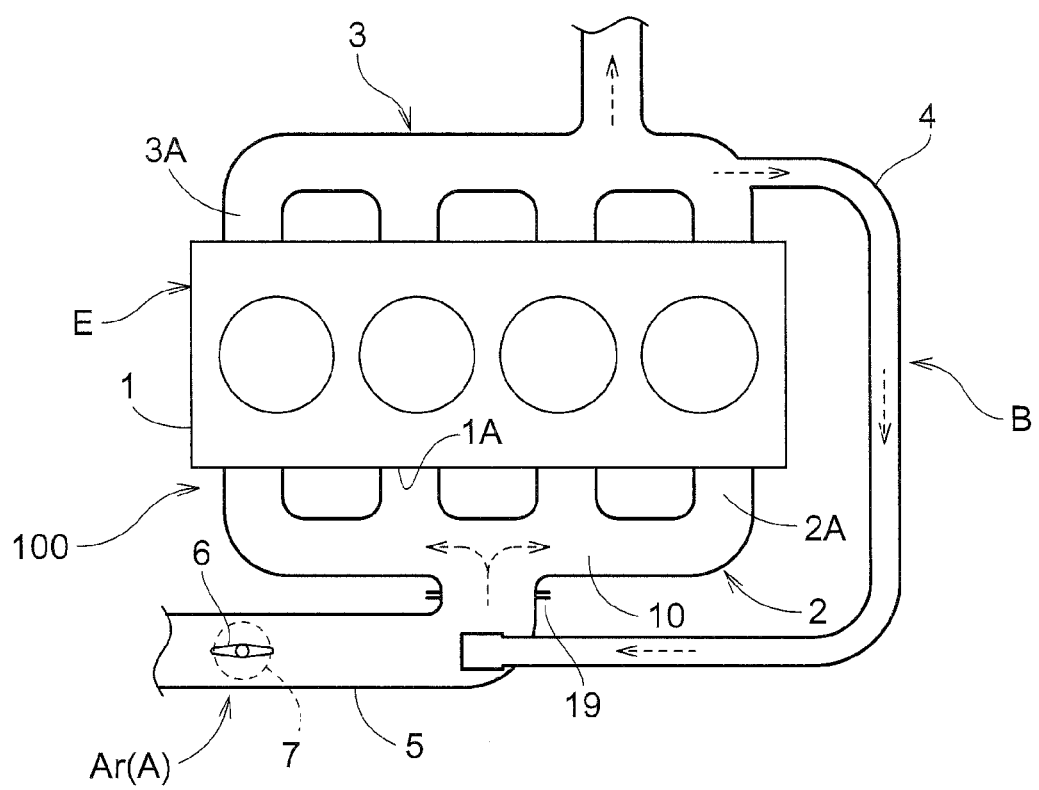
FIG. 1 is a schematic view of an intake and exhaust system of an engine.

FIG. 1 shows the engine E including the intake device 100. The timing and the period of time for intake in the engine E are controlled by an intake control device A. Further, the engine E of the current embodiment includes an EGR (Exhaust Gas Recirculation) device B provided between an exhaust channel and an intake channel for recirculating part of exhaust gas to the intake channel.

The intake manifold 2 is connected to one side surface of a cylinder head 1 through an intake valve (not shown) for supplying air to a combustion chamber. An exhaust manifold 3 is connected to the other side surface of the cylinder head 1 through an exhaust valve (not shown) for discharging exhaust gas from the combustion chamber. The intake manifold 2 has a plurality of branch sections 2A corresponding to the number of combustion chambers to which air is supplied from a single introduction section 10, and similarly, the exhaust manifold 3 has a plurality of branch sections 3A corresponding to the plurality of combustion chambers.

The EGR device B has a recirculation passage 4 for returning part of exhaust gas from the exhaust manifold 3 to the intake manifold 2. While not shown, an EGR cooler for cooling exhaust gas or an EGR valve for determining a volume of recirculation gas may be provided in an intermediate section of the recirculation passage 4. Further, a filter for filtering out unwanted substances contained in exhaust gas may be provided.

The EGR device B is configured to supply part of exhaust gas to the combustion chamber, thereby to mix intake air with exhaust gas containing water vapor, nitrogen and carbon dioxide as primary components and having a low oxygen concentration. With such a construction, the EGR device B can lower the combustion temperature to decrease the combustion speed and eventually to reduce production of NOx.

A feed pipe 5 is provided upstream of the intake manifold 2 for feeding air to the combustion chamber. A throttle Ar forming the intake control device A is provided downstream of the feed pipe 5. The throttle Ar is configured to regulate an amount of intake air fed to the combustion chamber of the engine E by opening or closing a valve member 6 with an electric motor 7. A DC motor that is capable of achieving a valve opening degree corresponding to a voltage is used as the electric motor 7. The electric motor 7 is provided with a rotation angle sensor having a rotary encoder, for example, for detecting a rotary phase of an output shaft. The valve opening degree is controlled in the electric motor 7 in response to the detection from the rotation angle sensor.

The exhaust manifold 3 includes, in addition to the recirculation passage 4 described above, an unillustrated exhaust gas purifier. Part of exhaust gas present in the engine E that has not been returned to the recirculation passage 4 is purified at the exhaust gas purifier and then discharged to the air.

2. Intake Manifold

Figure 2:
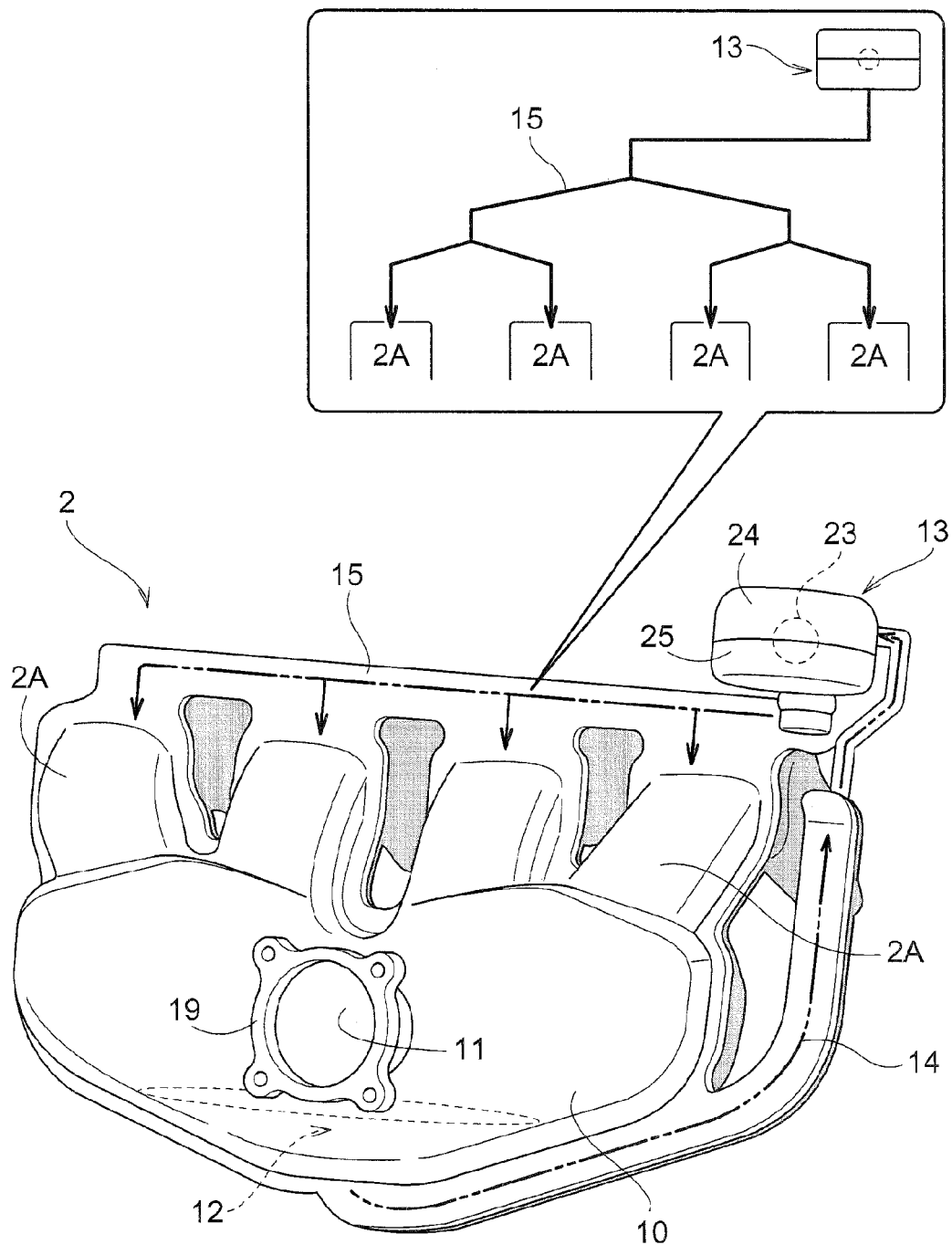
FIG. 2 is a schematic view of an intake manifold.

FIG. 2 is a schematic perspective view of the intake manifold 2 according to the present invention. The intake manifold 2 forms the intake device 100 and is fixedly connected to the side surface of the cylinder head 1 in the downstream side as set forth above. On the other hand, the feed pipe 5 and the recirculation passage 4 are connected at a flange section 19 in the upstream side.

Referring to FIG. 2, the intake manifold 2 includes an introduction section 10, an intake passage 11, a liquid reservoir 12, a differential pressure tank 13, a return passage 14, and a exhaust passage 15. The introduction section 10 is configured to introduce air to the combustion chamber of the engine E. The introduction section 10 is located upstream of the branch sections 2A and defines a space having a predetermined capacity surrounded by an inner wall of the intake manifold 2.

Air is supplied to the introduction section 10 through the intake passage 11. The intake passage 11 has a tubular shape having a predetermined inner diameter. While the feed pipe 5 is fixedly connected to the device upstream of the intake passage 11, the introduction section 10 is provided downstream of the intake passage 11. Thus, air having flown through the feed pipe 5 is supplied to the introduction section 10 through the intake passage 11.

The liquid reservoir 12 is provided under the introduction section 10 for retaining a liquid medium. Fuel as well as air is introduced into the intake manifold 2. Due to the construction of the engine E, the fuel is not introduced into the combustion chamber in whole, but remains in part within the intake manifold 2 in the form of liquid. Such liquid fuel represents the liquid medium described above. Water contained in air is also retained in the liquid reservoir 12 as the liquid medium. Such a liquid reservoir 12 retains fuel and water by gravity and thus is provided under the introduction section 10.

The differential pressure tank 13 includes a first chamber 24, a second chamber 25, and a differential pressure valve 23 for regulating a flow from the second chamber 25 to the first chamber 24. The interior of the differential pressure tank 13 is partitioned into the first chamber 24 and the second chamber 25 by the differential pressure valve 23. While the first chamber 24 defines a space upstream of the differential pressure valve 23, the second chamber 25 defines a space downstream of the differential pressure valve 23. The differential pressure valve 23 is configured to allow the first chamber 24 to communicate with the second chamber 25 when the pressure in the first chamber 24 is higher than the pressure in the second chamber 25 and to cut off the communication between the first chamber 24 and the second chamber 25 when the pressure in the first chamber 24 is lower than the pressure in the second chamber 25. The pressure difference between the first chamber 24 and the second chamber 25 for switching between the communicating state and the cut-off state can be determined depending on an elastic force of an urging element (not shown) of the differential pressure valve 23.

The return passage 14 is configured to return the liquid medium accumulated in the liquid reservoir 12 to the first chamber 24 from the liquid reservoir 12 when the pressure in the second chamber 25 is higher than the pressure in the first chamber 24. When the pressure in the second chamber 25 is higher than the pressure in the first chamber 24, the differential pressure valve 23 is closed to cut off the communication between the first chamber 24 and the second chamber 25. In this, the return passage 14 extends to allow a lower end of the liquid reservoir 12 to communicate with the first chamber 24. In such a case, the liquid medium accumulated in the liquid reservoir 12 flows into the first chamber 24 through the return passage 14 in response to the pressure difference between the liquid reservoir 12 and the first chamber 24. The liquid medium continues to flow until the pressure in the first chamber 24 becomes equivalent to the pressure in the second chamber 25.

The exhaust passage 15 is configured to discharge the liquid medium that has flown into the second chamber 25 from the first chamber 24 to the introduction section 10 when the pressure in the second chamber 25 is lower than the pressure in the first chamber 24. When the pressure in the second chamber 25 is lower than the pressure in the first chamber 24, the differential pressure valve 23 is opened to allow the first chamber 24 to communicate with the second chamber 25. As a result, the liquid medium in the first chamber 24 flows into the second chamber 25. In this, the exhaust passage 15 extends to allow a lower end of the second chamber 25 to communicate with the introduction section 10. In such a case, the liquid medium that has flown into the second chamber 25 flows into the introduction section 10 through the exhaust passage 15. It is preferable that the liquid medium flows into the introduction section 10 in the vicinity of the intake valve of the engine E.

In this, it is preferable that the differential pressure tank 13 is mounted above the introduction section 10. This allows the liquid medium to flow into the introduction section 10 smoothly from the first chamber 24 by the gravity when the first chamber 24 and the second chamber 25 communicate with each other. Since any pump or the like is dispensable, the cost reduction can be achieved.

As described above, the liquid medium in the liquid reservoir 12 flows into the first chamber 24 by the pressure difference between the first chamber 24 and the second chamber 25. In this condition, the pressure in the second chamber 25 is equivalent to the pressure in the introduction section 10. On the other hand, the pressure difference is maintained due to the presence of the liquid medium accumulated in the liquid reservoir, and the liquid medium in the liquid reservoir 12 is drawn up until the pressure in the first chamber 24 becomes equivalent to the pressure in the second chamber 25. Thus, it is more effective for the liquid medium to be drawn up from the liquid reservoir 12 that the pressure difference between the first chamber 24 and the introduction section 10 is large. To this end, the engine E is preferably provided with a supercharger. With such a construction, the pressure in the introduction section 10 can be determined at several tens of Pa, as a result of which the liquid medium in the liquid reservoir 12 can be efficiently drawn up to the first chamber 24.

Referring to FIGS. 1 and 2, the engine E is provided with a plurality of intake ports 1A. Thus, it is preferable that the exhaust passage 15 is a distribution passage for distributing the liquid medium to each of the plurality of intake ports 1A. An example of the distribution passage is shown in an upper part of FIG. 2. The exhaust passage 15 starts from the second chamber 25 as a single passage, and branched out into two passages. Each of the two passages is then branched out into further two passages. With such a construction, lengths of the exhaust passage 15 measured from the end of the second chamber 25 to the respective intake ports 1A can be all equal. Therefore, the liquid medium can be equally distributed to the plurality of intake ports 1A through the exhaust passage 15. As a result, the fuel/air mixing ratio can be uniform in each cylinder of the engine E, and it is prevented that a large volume of water flows into only a specific cylinder. Thus, any knocking and misfire can also be prevented.

3. Drawing-Up of Liquid Medium

Figure 3:
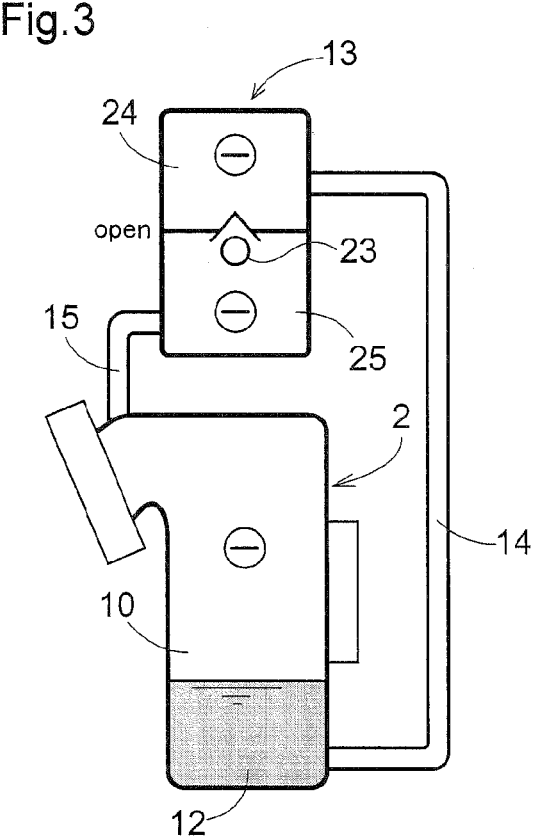
FIG. 3 is a schematic view illustrating a principle of drawing up a liquid medium.

Next, a system for drawing up the liquid medium will be described in reference to FIGS. 3 to 5. In FIG. 3, no liquid medium is present in the differential pressure tank 13. When the intake valve of the engine E is opened in this state, the introduction section 10 is in a negative-pressure state and the differential pressure valve 23 is closed. As a result, the pressure in the first chamber 24 becomes the same as the pressure in the second chamber 25, which prevents the liquid medium in the liquid reservoir 12 from being drawn up to the first chamber 24.

Figure 4:
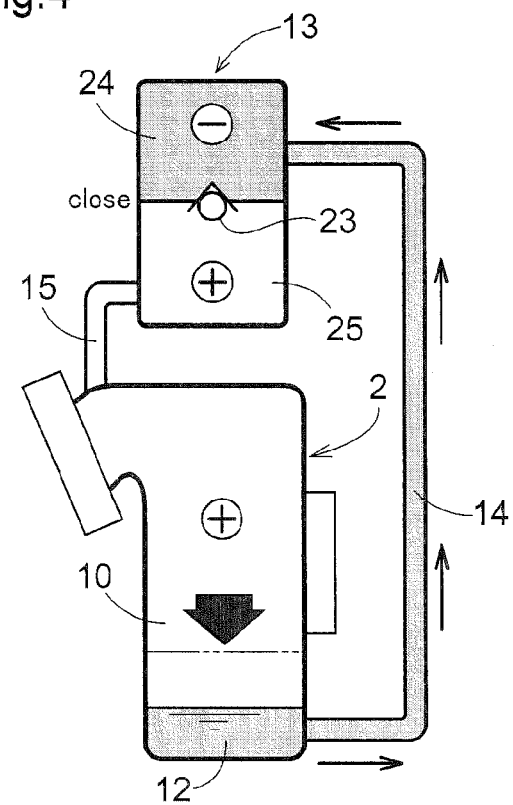
FIG. 4 is a schematic view illustrating the principle of drawing up the liquid medium.

When the intake valve of the engine E is closed and the instruction section 10 is pressurized by the supercharger, the pressure in the second chamber 25 is increased to close the differential pressure valve 23 as shown in FIG. 4. In such a case, a liquid surface in the liquid reservoir 12 is pressed down by the pressure of the introduction section 10, which allows the liquid medium in the liquid reservoir 12 to be drawn up to the first chamber 24 through the return passage 14.

Then, the intake valve of the engine E is opened, thereby to open the differential pressure valve 23 since the pressure in the first chamber 24 becomes higher than the pressure in the second chamber 25, as shown in FIG. 5. In this, the liquid medium in the first chamber 24 flows into the second chamber 25 through the differential pressure valve 23, and then distributed to the intake ports 1A through the exhaust passage 15. In this manner, the liquid medium accumulated in the liquid reservoir 12 of the introduction section 10 is allowed to recirculate to the intake ports 1A by the pressure difference between the first chamber 24 and the second chamber 25 (introduction section 10) of the differential pressure tank 13.

According to the intake manifold 2 of the present invention, since the liquid medium is drawn up by using the pressure difference between the first chamber 24 and the second chamber 25 of the differential pressure tank 13, the liquid medium in the liquid reservoir 12 can be discharged in a stable manner. Thus, it is possible to reduce the liquid medium in the liquid reservoir 12, while any knocking or the misfire can be prevented. Further, the use of the relatively inexpensive differential pressure valve 23 dispenses with any pump that is more expensive than the differential pressure valve 23, which can achieve cost reduction. Moreover, the exhaust passage 15 can be formed integrally with the introduction section 10, for example, which can reduce the manufacturing cost and save the space.

4. Alternative Embodiments

In the above-described embodiment, the engine E is provided with the EGR device B. Nonetheless, the present invention is not limited to such an embodiment. The present invention naturally may be applied to the intake manifold 2 of the engine E having no EGR device B.

In the above-described embodiment, the differential pressure tank 13 is mounted above the introduction section 10. Nonetheless, the present invention is not limited to such an embodiment. In a case where the differential pressure tank 13 is not mounted above the introduction section 10, it is naturally possible to draw up the liquid medium in the liquid reservoir 12 to the first chamber 24 by the pressure difference between the first chamber 24 and the second chamber 25 and then introduce the liquid medium into the introduction section 10 from the second chamber 25 by the pressure of the introduction section 10.

In the above-described embodiment, the engine E is provided with the supercharger. Nonetheless, the present invention is not limited to such an embodiment. Even in a naturally aspirated engine, the pressure difference can be produced between the first chamber 24 and the second chamber 25 of the differential pressure tank 13 in time of shifting gears in a transmission, for example. Thus, present invention naturally may be applied to the engine having no supercharger.

In the above-described embodiment, the exhaust passage 15 acts as the distribution passage for distributing the liquid medium to the plurality of intake ports 1A. Nonetheless, the present invention is not limited to such an embodiment. In the case of a single-cylinder engine, it is natural to design the exhaust passage 15 so as not to perform the uniform distribution. Even if the engine E includes the plurality of intake ports 1A, it is also naturally possible to design the exhaust passage 15 so as not to perform the uniform distribution.

In the above-described embodiment, the return passage 14 extends to allow the lower end of the liquid reservoir 14 to communicate with the first chamber 24. Nonetheless, the present invention is not limited to such an embodiment. Naturally, the return passage 14 may be provided in any position other than the lower end of the liquid reservoir 12.

The present invention may be applied to any intake manifold for introducing a gas mixture into a combustion chamber of an engine.

The invention claimed is:

1. An intake manifold comprising:
    an introduction section for introducing air to a combustion chamber of an engine;
    a liquid reservoir provided under the introduction section for retaining a liquid medium therein;
    a differential pressure tank including a first chamber, a second chamber, and a differential pressure valve for regulating a flow from the second chamber to the first chamber;
    a return passage for allowing the liquid medium accumulated in the liquid reservoir to return to the first chamber from the liquid reservoir when the pressure in the second chamber is higher than the pressure in the first chamber; and
    an exhaust passage for discharging the liquid medium having flown into the second chamber from the first chamber to the instruction section when the pressure in the second chamber is lower than the pressure in the first chamber.

2. The intake manifold according to claim 1, wherein the differential pressure tank is mounted above the introduction section.

3. The intake manifold according to claim 1, wherein the engine is provided with a supercharger.

4. The intake manifold according to claim 1, wherein the engine includes a plurality of intake ports, and the exhaust passage is a distribution passage for distributing the liquid medium to the plurality of the intake ports.

5. The intake manifold according to claim 1, wherein the engine includes a plurality of intake ports, and lengths of the exhaust passage measured from the differential pressure tank to the respective intake ports are all equal.

* * * * *